US012276408B1

(12) United States Patent
Zhang

(10) Patent No.: US 12,276,408 B1
(45) Date of Patent: Apr. 15, 2025

(54) UNDER-CABINET LIGHT

(71) Applicant: Qifen Zhang, Sichuan (CN)

(72) Inventor: Qifen Zhang, Sichuan (CN)

( * ) Notice: Subject to any disclaimer, the term of this patent is extended or adjusted under 35 U.S.C. 154(b) by 0 days.

(21) Appl. No.: 18/660,117

(22) Filed: May 9, 2024

(51) Int. Cl.

| | |
|---|---|
| ***F21V 23/00*** | (2015.01) |
| ***F21V 15/015*** | (2006.01) |
| ***F21V 19/00*** | (2006.01) |
| ***F21V 19/04*** | (2006.01) |
| ***F21V 21/096*** | (2006.01) |
| ***F21V 33/00*** | (2006.01) |
| *F21W 131/301* | (2006.01) |

(52) U.S. Cl.
CPC ............ *F21V 19/04* (2013.01); *F21V 15/015* (2013.01); *F21V 19/003* (2013.01); *F21V 21/096* (2013.01); *F21V 23/004* (2013.01); *F21V 33/0012* (2013.01); *F21W 2131/301* (2013.01)

(58) Field of Classification Search
CPC .. F21V 15/015; F21V 19/003; F21V 19/0035; F21V 23/004; F21V 23/006
See application file for complete search history.

(56) References Cited

U.S. PATENT DOCUMENTS 9,890,914 B2 * 2/2018 Hannawa .............. F21V 21/005

* cited by examiner

*Primary Examiner* — Sean P Gramling
(74) *Attorney, Agent, or Firm* — Hawaii Patent Services; Nathaniel K. Fedde; Kenton N. Fedde

(57) ABSTRACT

A under-cabinet light comprises housing and light-emitting module, the housing is provided with receiving cavity, the light-emitting module is detachably arranged in the receiving cavity, a connecting end cover is arranged on the housing and seals an end of the receiving cavity, light trough is arranged on a side wall of the receiving cavity, the light-emitting module comprises circuit board and light-emitting body detachably connected to the circuit board, a fixing seat is detachably arranged in the housing and located in the receiving cavity; a magnetic element is arranged on the fixing seat, the circuit board is connected to the connecting end cover, the light-emitting body is arranged in the light trough; when the connecting end cover is separated from the housing, the end of the receiving cavity is open, the connecting end cover drives the circuit board to move away from the receiving cavity.

14 Claims, 17 Drawing Sheets

UNDER-CABINET LIGHT

TECHNICAL FIELD

The invention relates to the technical field of lighting equipment, in particular to a novel under-cabinet light.

BACKGROUND

With the continuous development in the lighting industry, various lighting devices have flooded the market. Under-cabinet lights, as one type of lighting devices, are mainly used in cabinets such as cupboards and wardrobes.

At present, under-cabinet lights on the market are typically composed of a housing, a circuit board, a battery and a light-emitting body. Most parts of these under-cabinet lights are connected fixedly, so when one part is damaged, the damaged part cannot be detached and replaced separately by users.

Moreover, when installed in cabinets, the under-cabinet lights can be magnetically connected to the cabinets more easily, so most under-cabinet lights on the market are attached onto cabinets by magnetic elements. However, the magnetic elements on the market are often bonded on the housing of the under-cabinet lights with glue, and the application amount of glue is difficult to control in the bonding process, and the glue may overflow, compromising the aesthetics of the cabinets. In addition, because the fixing strength of glue is weak, the magnetic element will fall off after long-term use.

In view of the above problems, a novel under-cabinet light, which is easy to assemble and disassemble, allows users to detach and replace a damaged part separately and has a magnetic element firmly connected to a housing and prevented from falling off from the housing, needs to be provided.

SUMMARY

The invention provides a novel under-cabinet light, comprising a housing and a light-emitting module, wherein:

the housing is provided with a receiving cavity, the light-emitting module is detachably arranged in the receiving cavity, a connecting end cover is detachably connected to the housing and seals an end of the receiving cavity to prevent the light-emitting module from disengaging from the end of the receiving cavity, and a light trough is arranged on a side wall of the receiving cavity; and the light-emitting module comprises a circuit board and a light-emitting body detachably connected to the circuit board; and wherein, a fixing seat is detachably arranged in the housing and located in the receiving cavity, and a magnetic element is arranged on the fixing seat; and the circuit board is detachably connected to the connecting end cover, and the light-emitting body is slidably arranged in the light trough; and when the connecting end cover is separated from the housing, the end of the receiving cavity is open, the connecting end cover drives the circuit board to move away from the receiving cavity, and the light-emitting body slides in a length direction of the receiving cavity to be separated from the housing.

The invention further provides a novel under-cabinet light, comprising a housing and a light-emitting module, wherein:

the housing is provided with a receiving cavity, the light-emitting module is detachably arranged in the receiving cavity, a connecting end cover is detachably connected to the housing and seals an end of the receiving cavity to prevent the light-emitting module from disengaging from the end of the receiving cavity, light troughs and sliding grooves are arranged on side walls of the receiving cavity, and the light troughs are connected to the sliding grooves to allow light emitted by light-emitting bodies to be guided to the outside by a light guide module;

the light-emitting module comprises a circuit board, the light-emitting bodies and the light guide module, and the light-emitting bodies are detachably connected to the circuit board; and wherein, a fixing seat is detachably arranged in the housing and located in the receiving cavity, and a magnetic element is arranged on the fixing seat; and the circuit board is detachably connected to the connecting end cover, and the light-emitting bodies and the light guide module are slidably arranged in the light troughs and the sliding grooves respectively; and when the connecting end cover is separated from the housing, the end of the receiving cavity is open, the connecting end cover drives the circuit board to move away from the receiving cavity, and the light-emitting bodies and the light guide module slide in a length direction of the receiving cavity to be separated from the housing.

The invention further provides a method for lighting a cabinet, comprising a novel under-cabinet light and a cabinet, wherein:

the novel under-cabinet light comprises a housing and a light-emitting module, wherein:

the housing is provided with a receiving cavity, the light-emitting module is detachably arranged in the receiving cavity, a connecting end cover is detachably connected to the housing and seals an end of the receiving cavity to prevent the light-emitting module from disengaging from the end of the receiving cavity, and a light trough is arranged on a side wall of the receiving cavity; and the light-emitting module comprises a circuit board and a light-emitting body detachably connected to the circuit board; and wherein, a fixing seat is detachably arranged in the housing and located in the receiving cavity, and a magnetic element is arranged on the fixing seat; and the circuit board is detachably connected to the connecting end cover, and the light-emitting body is slidably arranged in the light trough; when the connecting end cover is separated from the housing, the end of the receiving cavity is open, the connecting end cover drives the circuit board to move away from the receiving cavity, and the light-emitting body slides in a length direction of the receiving cavity to be separated from the housing; and the method comprises:

clamping the circuit board on the connecting end cover; and electrically connecting the light-emitting body and the circuit board by a wire; and turning on the power supply to allow the light-emitting body to work, and controlling the light-emitting body by the circuit board; and attracting the novel under-cabinet onto the cabinet by the magnetic element.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

In the drawings.

Figure 1:
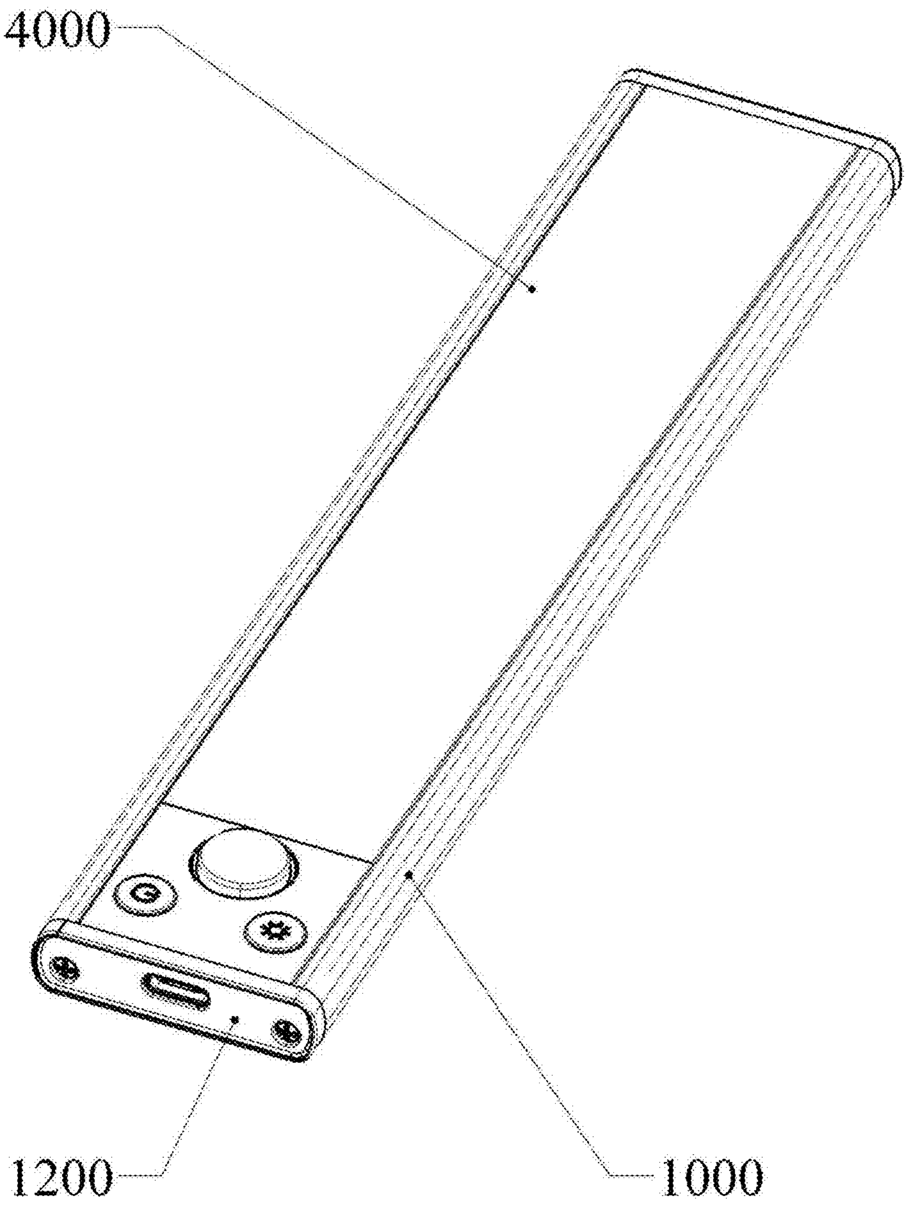
FIG. 1 is a schematic diagram of an under-cabinet light according to the invention.

(1000), housing; (1100), receiving cavity; (1110), light trough; (1120), sliding groove; (1130), slot; (1140), screw hole; (1150), sliding rail; (1200), connecting end cover; (1210), connecting plate; (1220), insert; (1230), through-hole; (1240), bulge; (1250), clamping piece; (1260), light lens; (1270), spacer block; (1280), sealing end cover; (2000), light-emitting module; (2100), circuit board; (2110), clamping hole; (2120), infrared sensor; (2130), light threshold sensor; (2140), key; (2150), socket; (2200), light-emitting body; (2210), light panel; (2220), light-emitting element; (3000), power supply; (3100), flexible element; (4000), light guide module; (4100), light guide plate; (4200), diffusion plate; (5000), fixing seat; (5100), slide buckle; (5200), fixing cavity; (5300), magnetic element.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As a preferred embodiment of the invention, the invention provides a novel under-cabinet light, which is easy to assemble and disassemble, allows users to detach and replace a damaged part separately and has a magnetic element firmly connected to a housing and prevented from falling off from the housing.

Figure 2:
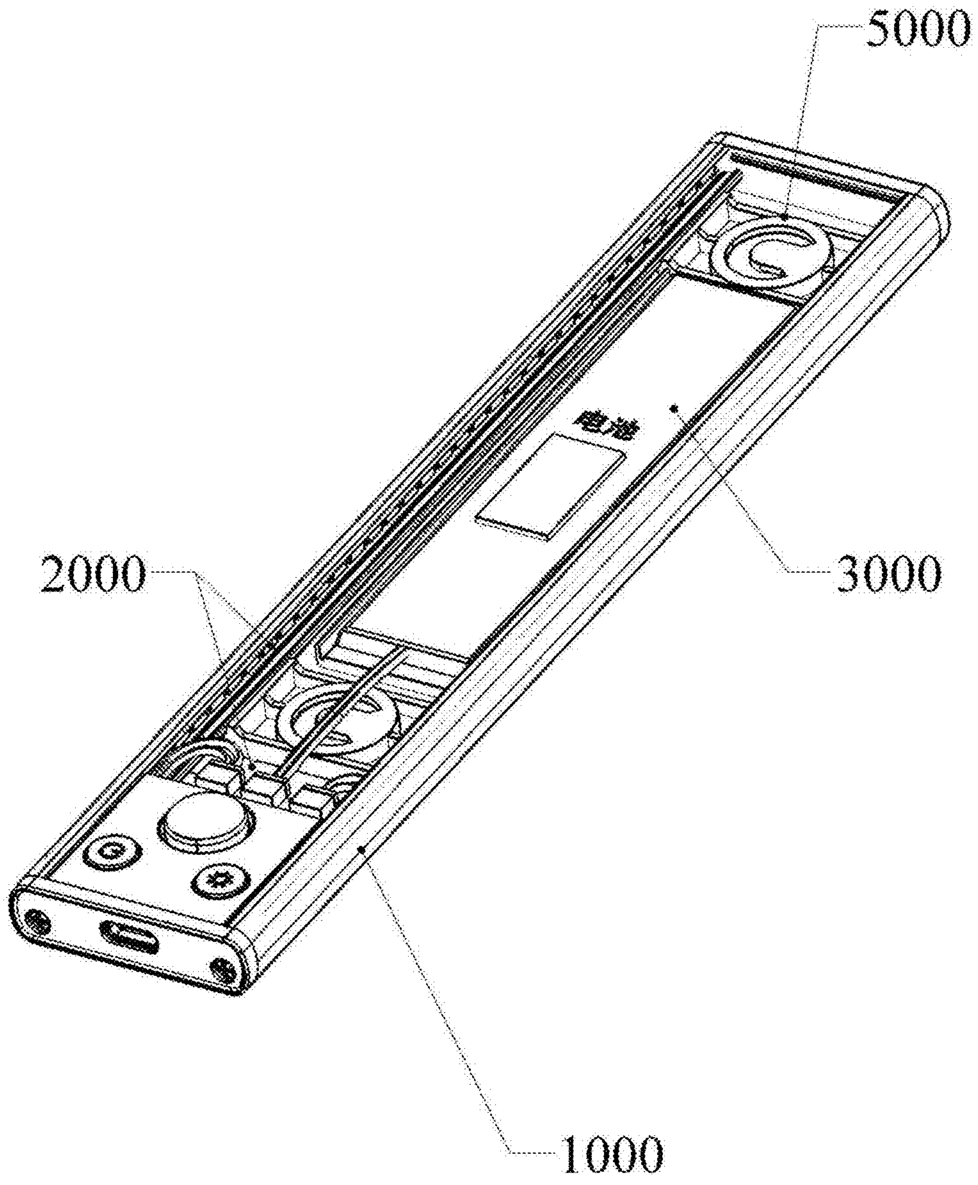
FIG. 2 is a schematic diagram of the under-cabinet light according to the invention.
Figure 3:
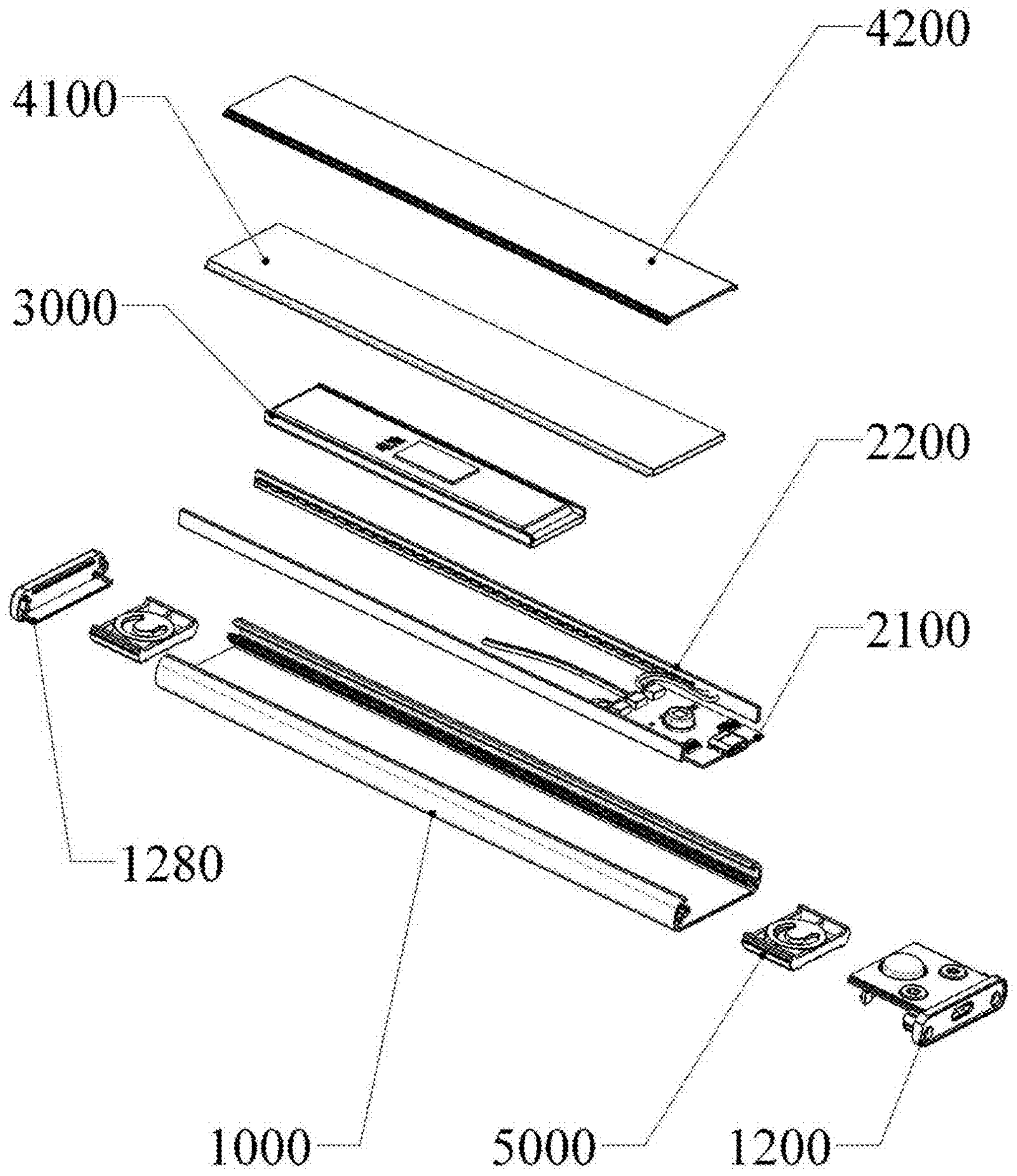
FIG. 3 is an exploded view of the under-cabinet light according to the invention.
Figure 4:
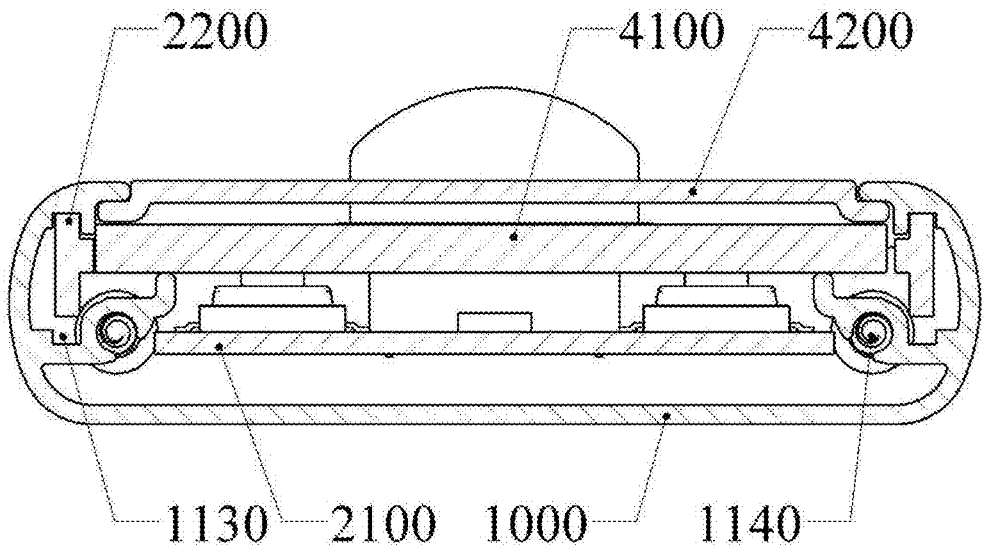
FIG. 4 is a sectional view of the under-cabinet light according to the invention.
Figure 5:
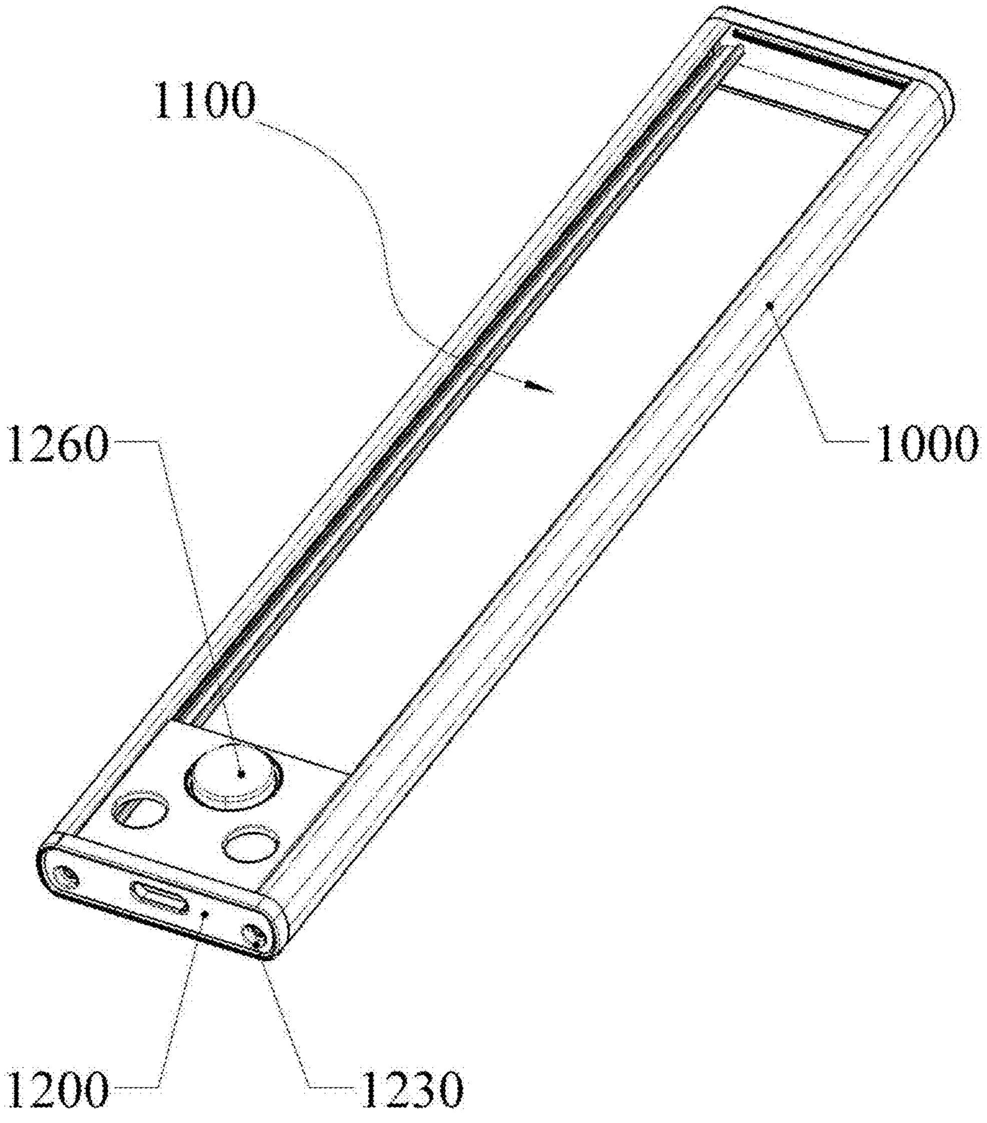
FIG. 5 is a schematic diagram of a housing according to the invention.
Figure 6:
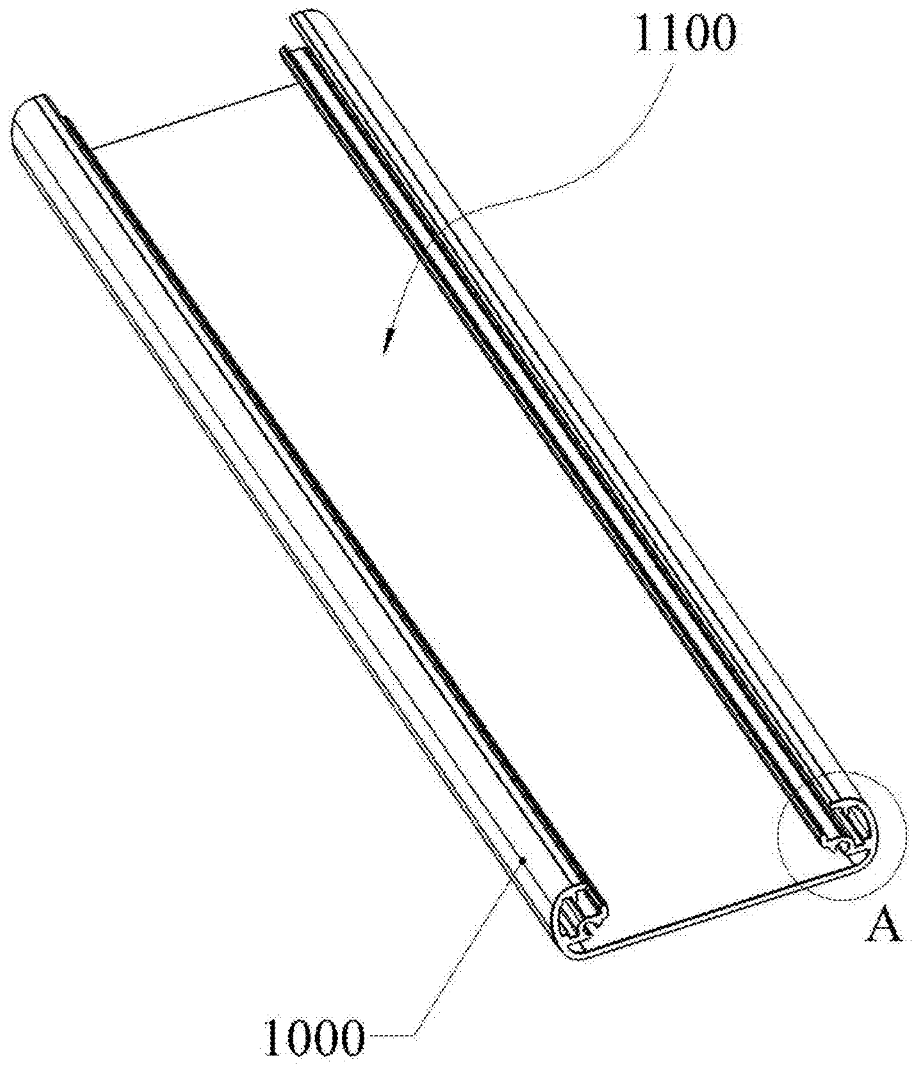
FIG. 6 is a schematic diagram of the housing according to the invention.
Figure 7:
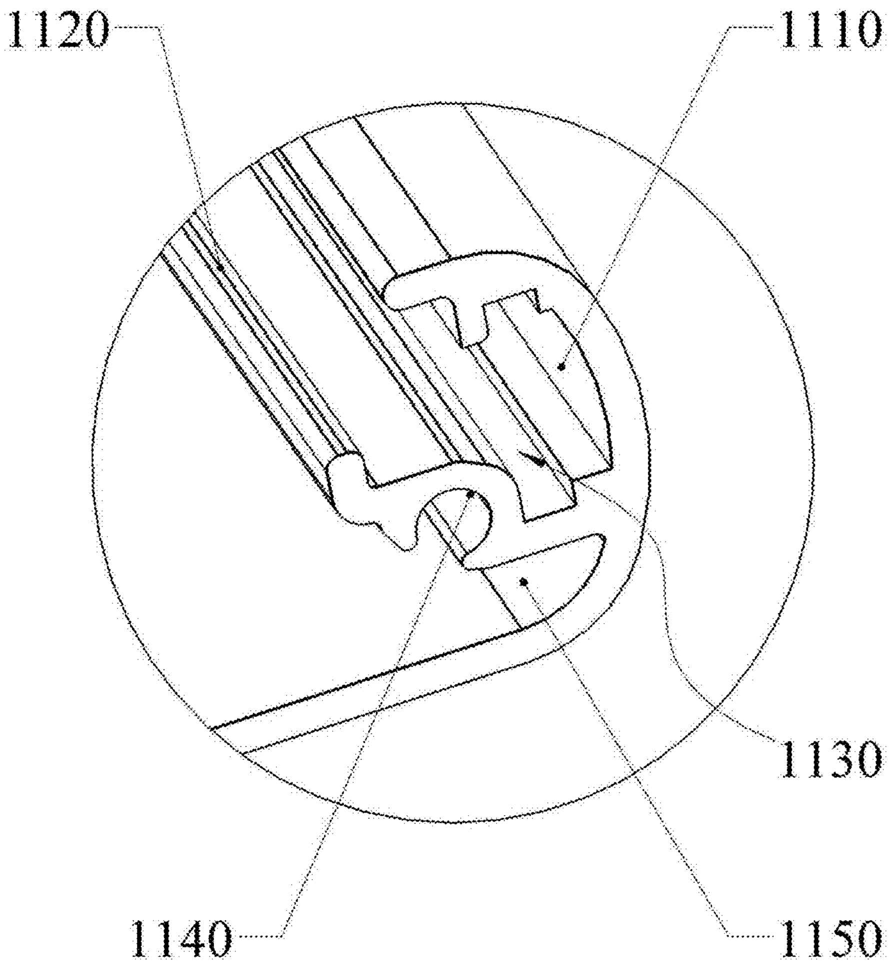
FIG. 7 is an enlarged view of part A in FIG. 6.
Figure 8:
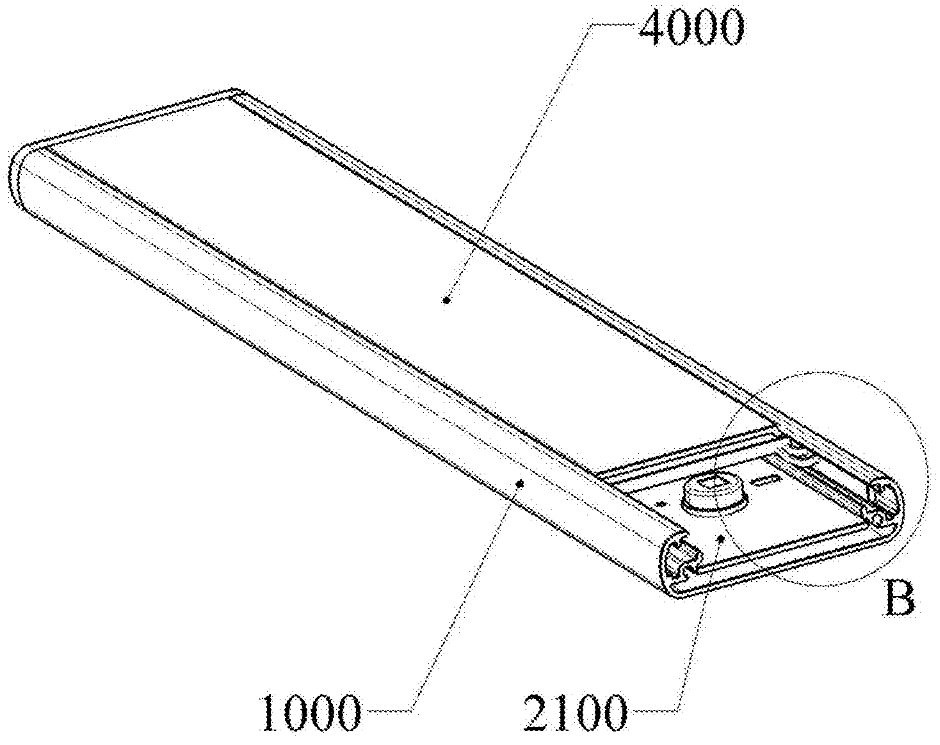
FIG. 8 is a schematic diagram of the housing according to the invention.
Figure 9:
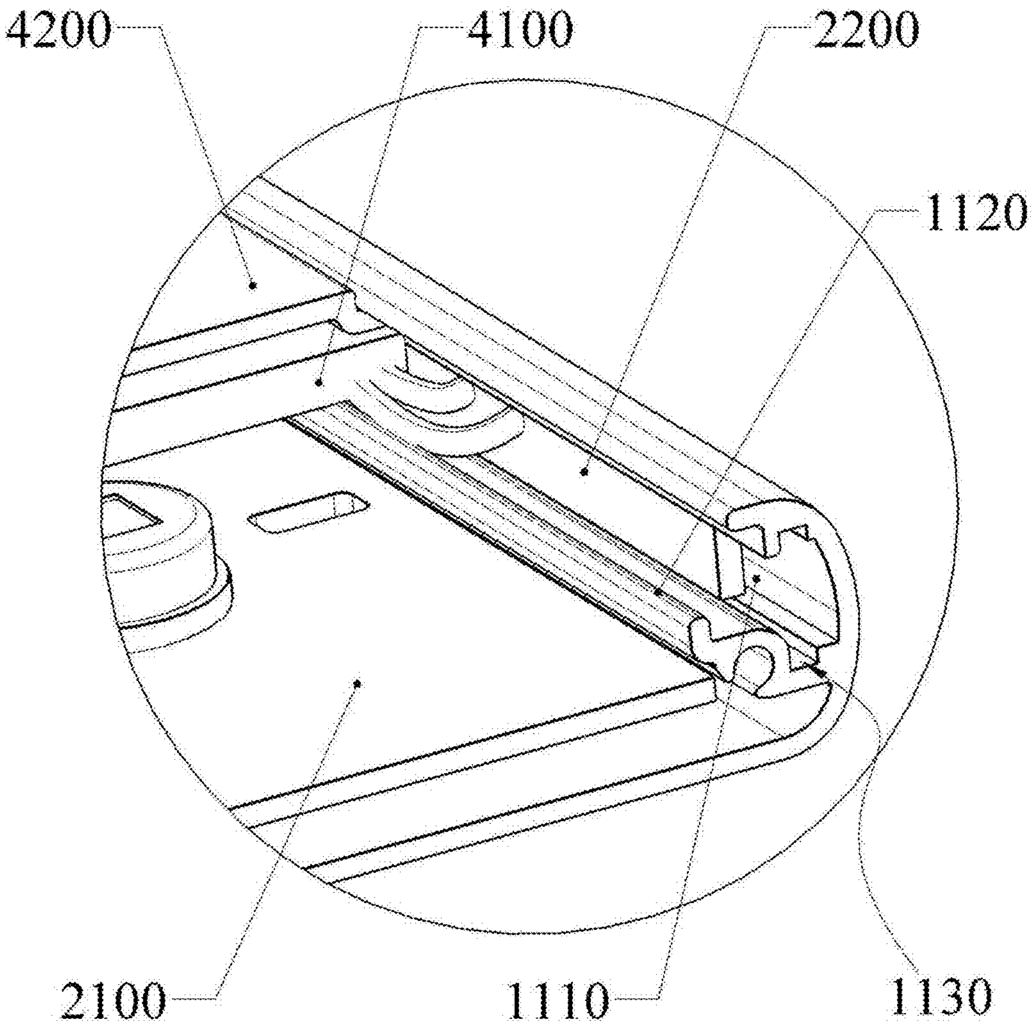
FIG. 9 is an enlarged view of part B in FIG. 8.
Figure 10:
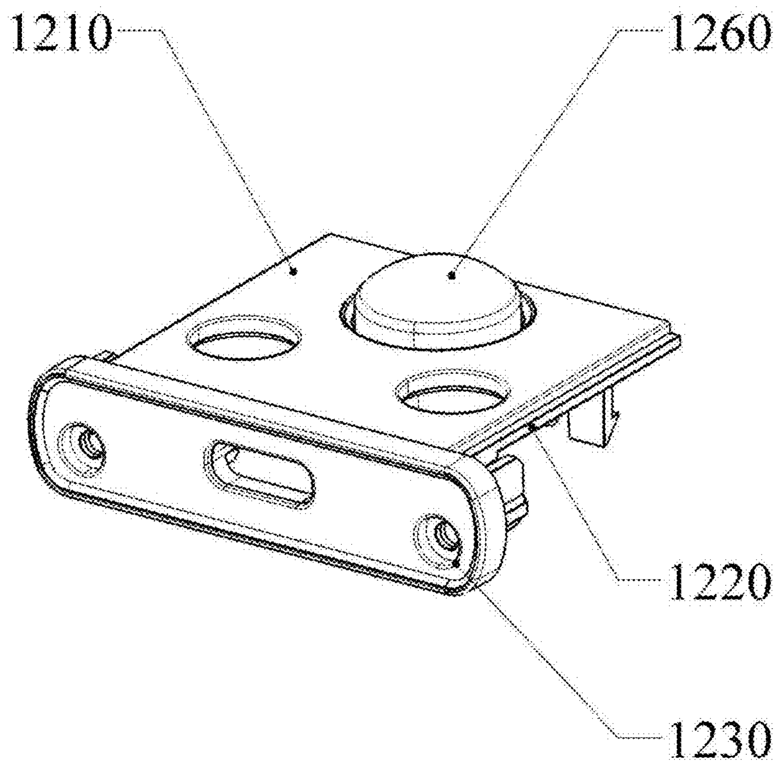
FIG. 10 is a schematic diagram of a connecting end cover according to the invention.

Referring to FIG. 1-FIG. 3, a novel under-cabinet light comprises a housing 1000 and a light-emitting module 2000, wherein the light-emitting module 2000 is detachably arranged in the housing 1000.

Referring to FIG. 2-FIG. 5, the housing 1000 is provided with a receiving cavity 1100, the light-emitting module 2000 is detachably arranged in the receiving cavity 1100, and a connecting end cover 1200 is detachably connected to the housing 1000 and used for sealing an end of the receiving cavity 1100 to prevent the light-emitting module 2000 from disengaging from the end of the receiving cavity 1100.

In this embodiment, one connecting end cover 1200 is detachably connected to the housing 1000, a sealing end cover 1280 is detachably arranged on the housing 1000, and the sealing end cover 1280 and the connecting end cover 1200 are arranged oppositely and located at two ends of the housing 1000 respectively to seal or open the receiving cavity 1100.

In another embodiment (not shown), the connecting end cover 1200 is detachably connected to the housing 1000, and the housing 1000 is not provided with the sealing end cover 1280 and has a closed end and an open end, that is, one end of the housing 1000 is closed and the other end of the housing 1000 is open; the light-emitting module 2000 may be placed in the housing 1000 from the open end, and then the open end is sealed by the connecting end cover 1200, such that the light-emitting module 2000 cannot be taken out from the two ends of the housing 1000.

Further, referring to FIG. 4-FIG. 7, the receiving cavity 1100 is provided with a slot 1130, the connecting end cover 1200 comprises a connecting plate 1210 and an insert 1220, the connecting plate 1210 is slidably arranged in the slot 1130, and the insert 1220 is inserted into a light trough 1110, such that the connecting end cover 1200 is arranged in the receiving cavity 1100.

Further, a screw hole 1140 is formed in the receiving cavity 1100, and a through-hole 1230 matched with the screw hole 1140 is formed in the connecting end cover 1200. When the connecting end cover 1200 are inserted into two ends of the housing 1000, the connecting plates 1210 of the connecting end cover 1200 are located in the receiving cavity 1100, the screw holes 1140 coincide with the through-holes 1230, and the connecting end cover 1200 may be fixed at the two ends of the housing 1000 by fasteners. In this embodiment, the fasteners are bolts. Specifically, the bolts penetrate through the through-holes 1230 and are threadedly connected to the screw holes 1140, such that the connecting end cover 1200 are mounted on the housing 1000. When the connecting end cover 1200 need to be detached from the housing 1000, the bolts are unscrewed from the screw holes 1140 and the through-holes 1230, and then the connecting end cover 1200 are pulled out of the receiving cavity 1100, such that the connecting end cover 1200 are separated from the housing 1000. In this way, operation is easy, and the manufacturing cost is low.

In other embodiments (not shown), the fasteners may be pins, keys and other components with a connection function. In some embodiments (not shown), the connecting end cover 1200 may be detachably mounted on the housing 1000 in a clamped manner, a magnetic manner, or in other manners.

Referring to FIG. 1-FIG. 3, the light-emitting module 2000 comprises a circuit board 2100 and light-emitting bodies 2200 detachably connected to the circuit board 2100. In this embodiment, the circuit board 2100 is detachably connected to the connecting end cover 1200.

In this embodiment, referring to FIG. 10-FIG. 13, bulges 1240 and clamping pieces 1250 are fixedly arranged on the connecting end cover 1200, and the clamping pieces 1250 extend downwards from the connecting plate 1210. The circuit board 2100 comprises clamping holes 2110. When the circuit board 2100 and the connecting end cover 1200 are connected, the circuit board 2100 is laid on the bulges 1240, and the clamping pieces 1250 penetrate through the clamping holes 2110, such that the circuit board 2100 is clamped on the connecting end cover 1200.

Figure 12:
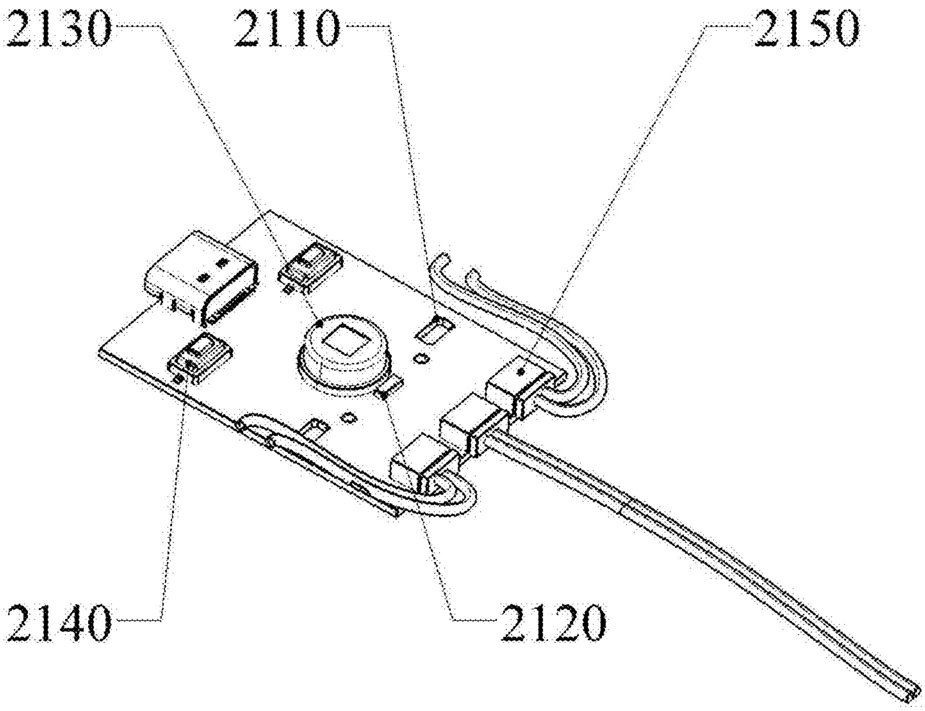
FIG. 12 is a schematic diagram of a circuit board according to the invention.
Figure 13:
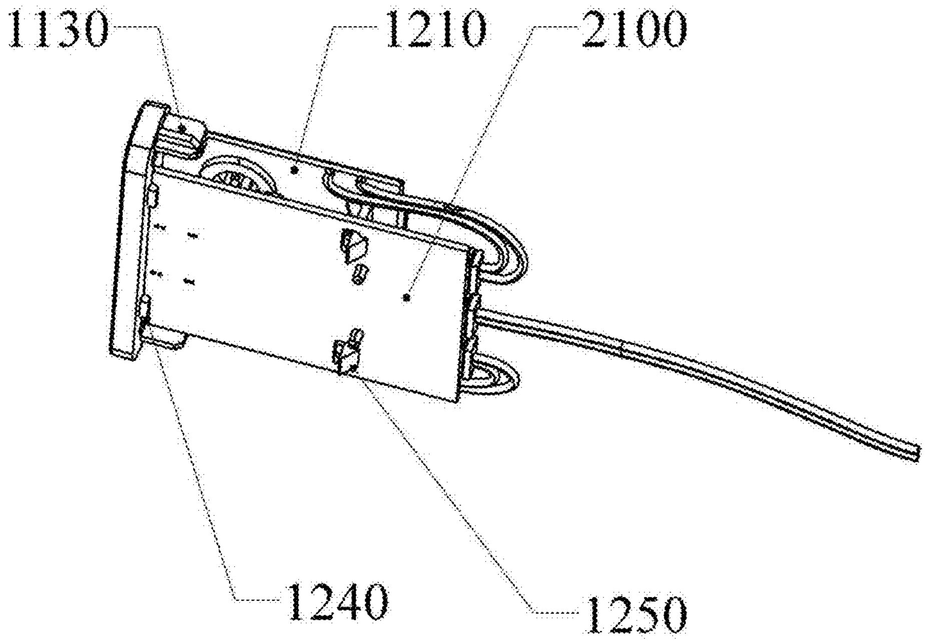
FIG. 13 is a schematic connection diagram of the connecting end cover and the circuit board according to the invention.
Figure 14:
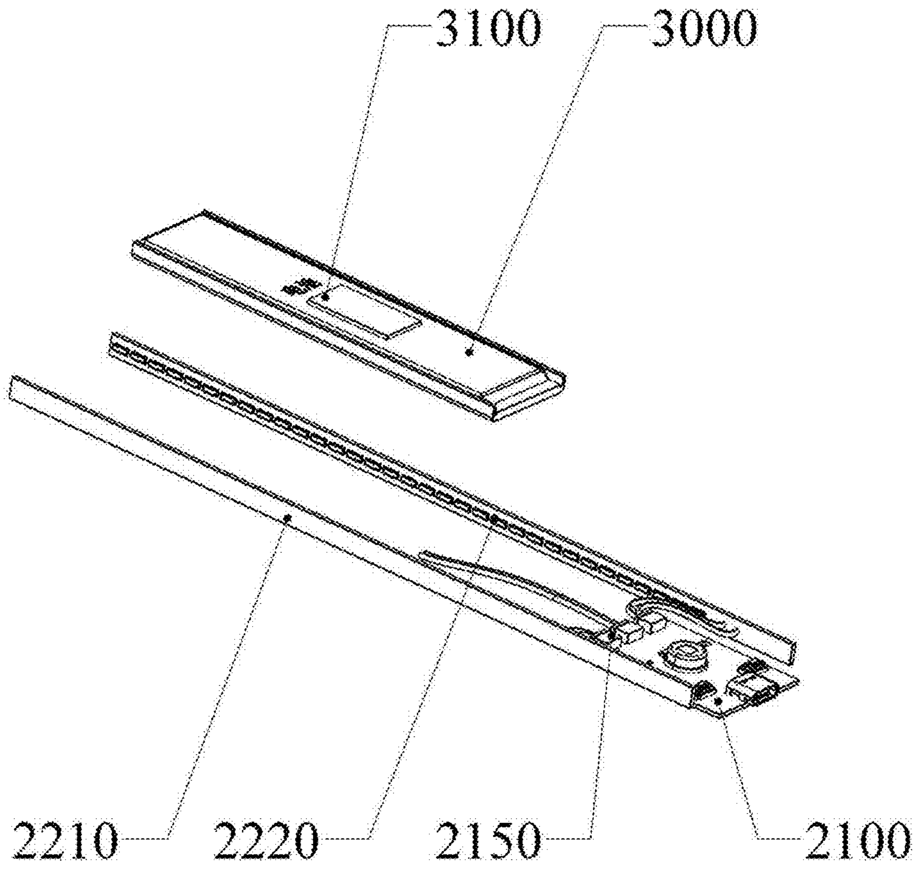
FIG. 14 is an exploded view of a light-emitting module according to the invention.

Further, referring to FIG. 12, sockets 2150 are fixedly arranged on the circuit board 2100, and the light-emitting bodies 2200 are electrically connected into the sockets 2150 by wires. The circuit board 2100 controls the operation of the light-emitting bodies 2200. Referring to FIG. 14, in this embodiment, the light-emitting body 2200 comprises a light panel 2210 and light-emitting elements 2220 arranged on the light panel 2210 at intervals in a length direction of the receiving cavity. In other embodiments (not shown), the light-emitting elements 2220 may be arranged on the light panel 2210 continuously or in other manners.

Figure 11:
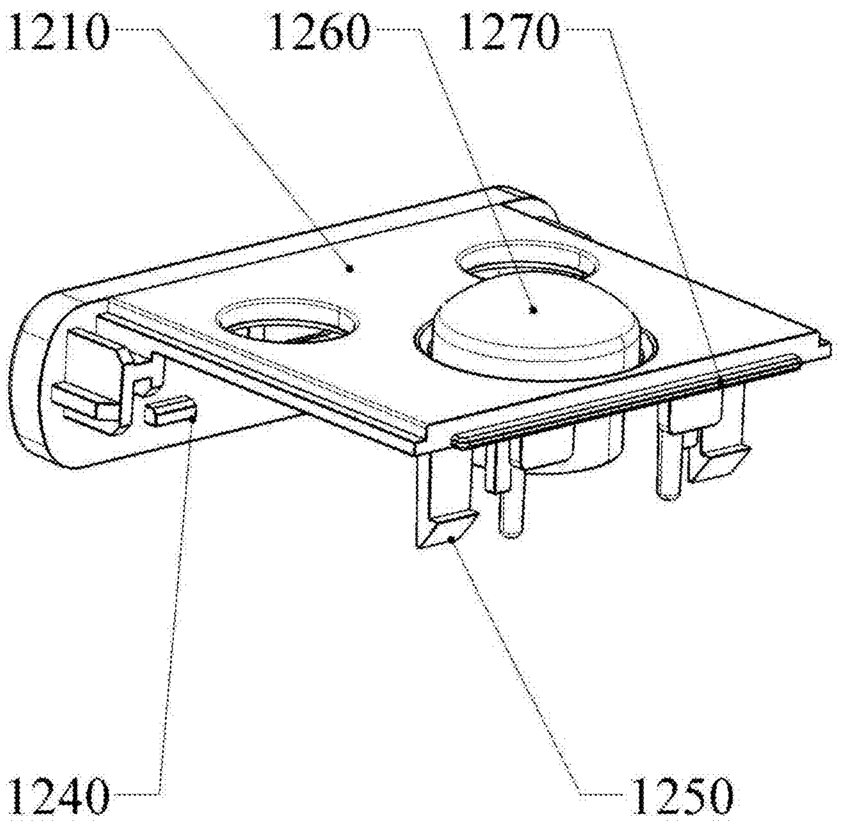
FIG. 11 is a schematic diagram of the connecting end cover according to the invention.

Referring to FIG. 11, a light lens 1260 is arranged on the connecting plate 1210, and light from the outside is irradiated onto the circuit board 2100 by the light lens 1260. An infrared sensor 2120, a light threshold sensor 2130 and a key 2140 are arranged on the circuit board 2100, and the infrared sensor 2120 and the light threshold sensor 2130 monitor the outside condition by the light lens 1260. Wherein, the light threshold sensor 2130 is used for detecting the light condition in the outside, and the infrared sensor 2120 is used for detecting infrared features of human bodies. The key 2140 penetrates through the connecting plate 1210 and is used by users to control operation of the circuit board 2100. By adopting such a design, the under-cabinet light has both a normally on mode and an intelligent control mode.

Specifically, users can switch the operating mode of the under-cabinet light by the key 2140. For example, when a user presses the key 2140 for a first time, the light-emitting elements 2220 can be directly turned on by the circuit board 2100, such that the under-cabinet light is in the normally-on mode to keep lighting; when the user presses the key 2140 for a second time, the under-cabinet light is switched to the intelligent control mode; and when the user presses the key 2140 for a third time, the under-cabinet light is turned off. In this way, users can select the operating mode of the under-cabinet light according to requirements.

Wherein, when the under-cabinet light is switched to the intelligent control mode, the under-cabinet light works as follows:

(1) In a case where the infrared sensor 2120 monitors that the infrared feature of a human body is changing (the human body is moving or approaching a cabinet) and the light threshold sensor 2130 monitors that the ambient light intensity is high enough, the turn-on condition is not satisfied, and the under-cabinet light will not be turned on.

(2) In a case where the light threshold sensor 2130 monitors that the ambient light intensity is low (the ambient light is dim) and the infrared sensor 2120 does not monitor the infrared feature of a human body (no human body is around the cabinet or the human body is static), the turn-on condition is not satisfied either, or the under-cabinet light will not be turned on.

(3) In a case where the light threshold sensor 2130 monitors that the ambient light is dim and the infrared sensor 2120 and the infrared sensor 2120 monitors that the infrared feature of a human body is changing (the human body is moving), the infrared sensor 2120 and the light threshold sensor 2130 will send a signal to the circuit board 2100 to start the light-emitting elements 2220 to turn on the under-cabinet light.

Therefore, the intelligent control mode realized by the infrared sensor 2120 and the light threshold sensor 2130 can simulate the usage scenario to avoid unnecessary lighting, thus voiding waste caused by excessive use of electric energy and prolonging the service life of the under-cabinet light.

Referring to FIG. 2-FIG. 9, light troughs 1110 are formed inside walls of the receiving cavity 1100, the light-emitting bodies 2200 are slidably received in the light troughs 1110, the light troughs 1110 are located on two sides of the housing 1000, and the length of the light panels 2210 is less than the length of the light troughs 1110. In this way, when the light panels 2210 are arranged in the light troughs 1110, some space will still be reserved to receive the inserts 1220 of the connecting end cover 1200, such that the light panels 2210 can be stably fixed in the receiving cavity 1100 by the connecting end cover 1200.

Figure 15:
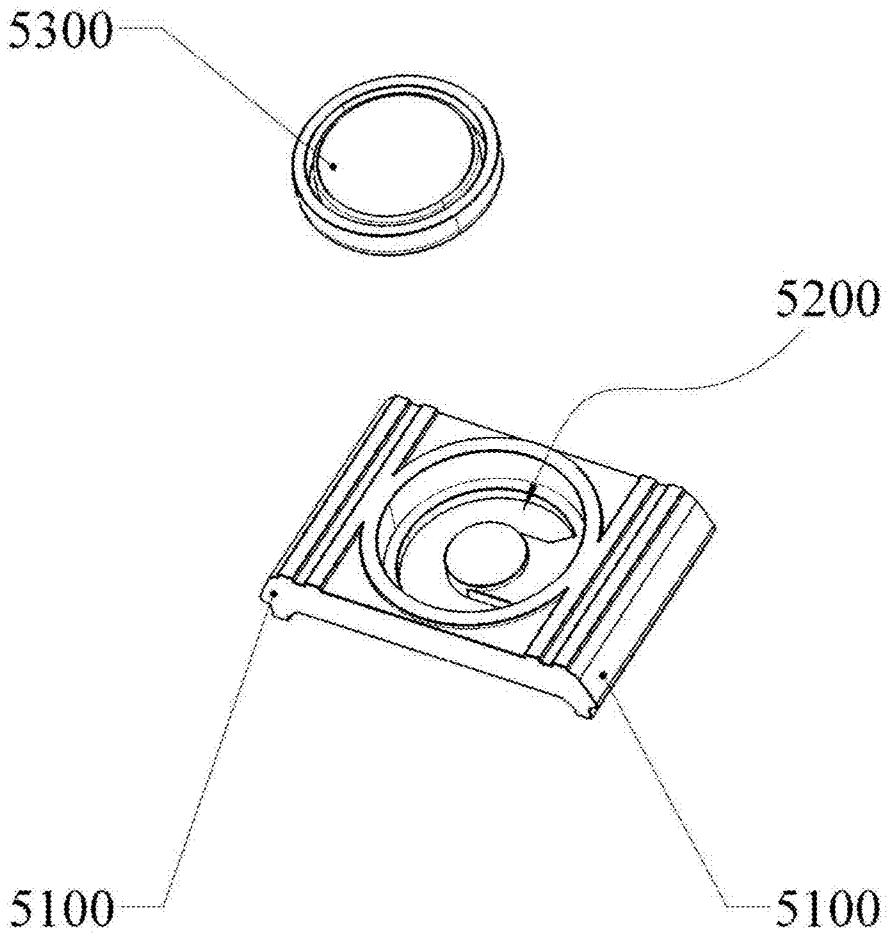
FIG. 15 is a schematic diagram of a fixing seat according to the invention.
Figure 16:
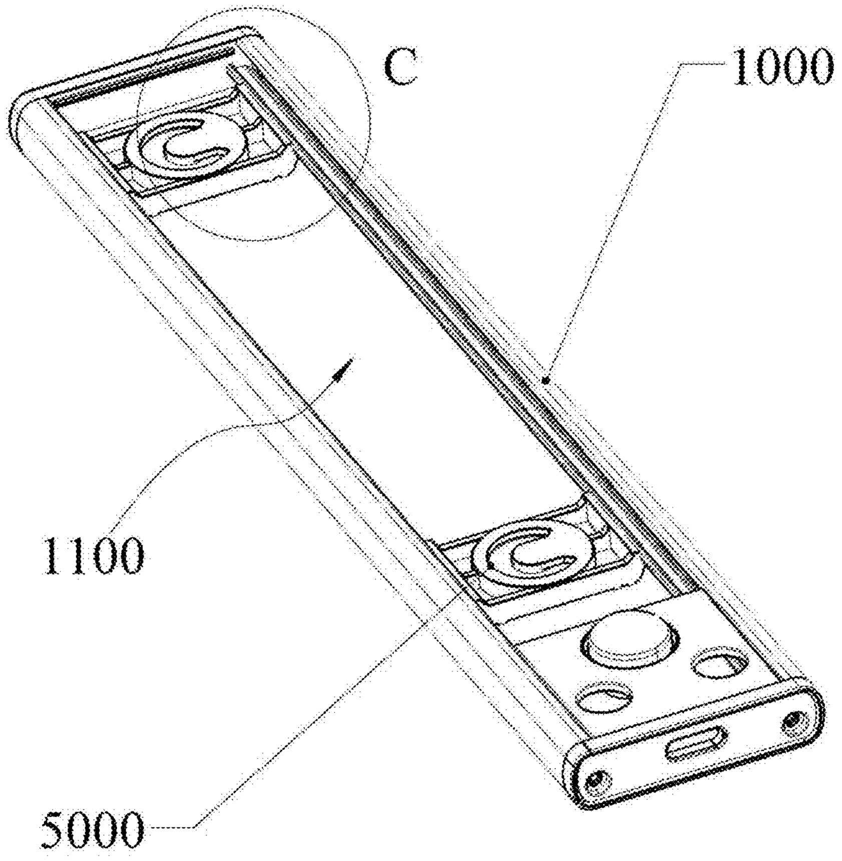
FIG. 16 is a schematic connection diagram of the fixing seat and a receiving cavity according to the invention.
Figure 17:
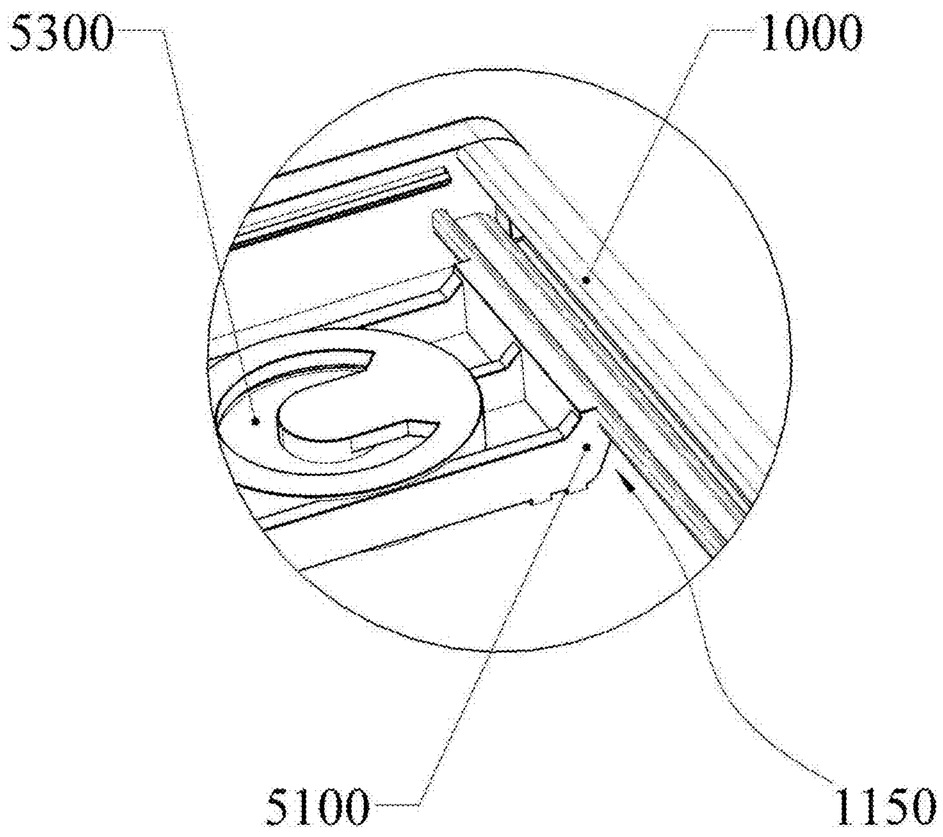
FIG. 17 is an enlarged view of part C in FIG. 16.

Referring to FIG. 3 and FIG. 16, a fixing seat 5000 is detachably arranged in the housing 1000 and located in the receiving cavity 1100. Specifically, as shown in FIG. 15-FIG. 17, a sliding rail 1150 is arranged at the bottom of the receiving cavity 1100, slide buckles 5100 are arranged at two ends of the fixing seat 5000 and are in transition fit with the sliding rail 1150 to slidably arrange the fixing seat 5000 in the receiving cavity 1100. "Transition fit" means that the width of the sliding rail 1150 is slightly less than the width of the slide buckles 5100 and the slide buckles 5100 can still be arranged in the sliding rail 1150. When static, the fixing seat 5000 is fixed to a current position by the slide buckles 5100 and will not slide freely. A magnetic element 5300 is arranged on the fixing seat 5000, such that the under-cabinet light can be magnetically fixed to a cabinet.

Further, referring to FIG. 15, the fixing seat 5000 is provided with a fixing cavity 5200, the magnetic element 5300 is arranged in the fixing cavity 5200, and the fixing cavity 5200 is made from an elastic material. In this way, the receiving height of the fixing cavity 5200 can be changed to allow magnetic elements 5300 with different thicknesses to be received in the fixing cavity 5200.

The fixing cavity 5200 is made from rubber, plastic or metal, has a deformation capacity and a restoration capacity, and can deform to different extents within a permissible thickness range according to magnetic elements 5300 with different thicknesses, such that the fixing cavity 5200 can receive magnetic elements 5300 with different thicknesses, and the situation where the magnetic element 5300 fails to be installed due to size discrepancies is avoided, thus improving the adaptivity of the fixing seat 5000.

Specifically, when the installation position of the under-cabinet light needs to be adjusted, the fixing seat 5000 is shifted to move in a length direction of the sliding rail 1150 to a suitable position and is then limited and fixed to the current position under the combined action of the slide buckles 5100 and the sliding rail 1150.

In this embodiment, two fixing seats 5000 are arranged to better support the under-cabinet light, such that the under-cabinet light can be more stably installed on a cabinet; and in the presence of multiple fixing seats 5000, the under-cabinet light can be installed more flexibly by sliding the fixing seats 5000. In other embodiments (not shown), one, three or more the fixing seats 5000 can be arranged.

Further, referring to FIG. 1-FIG. 9, the light-emitting module 2000 further comprises a light guide module 4000, and sliding grooves 1120 are formed in the side walls of the receiving cavity 1100. The light guide module 4000 is slidably arranged in the sliding grooves 1120. The light guide module 4000 is arranged above the receiving cavity 1100, and the light guide module 4000 and the connecting end cover 1200 completely seal the receiving cavity 1100, such that parts are prevented from falling out of the receiving cavity 1100.

In this embodiment, the light troughs 1110 and the sliding grooves 1120 are arranged on two side walls of the receiving cavity 1100, two light-emitting bodies 2200 are correspondingly arranged in the light troughs 1110, and the light guide module 4000 is slidably connected to the receiving cavity 1100 by the sliding grooves 1120. The receiving cavity 1100, the light troughs 1110 and the sliding grooves 1120 extend and penetrate through the housing 1000 to be connected to the outside, such that the light-emitting body 2200 and the light guide module 4000 are able to slide in and out of the light troughs 1110 and the sliding grooves 1120 respectively.

In this embodiment, the light-emitting bodies 2200 can emit light in different colors, and the circuit board 2100 can control one the light-emitting body 2200 to be turned on separately or control the two light-emitting bodies 2200 to be turned on synchronously to obtain light in multiple colors to create a suitable display atmosphere according to the service environment. In another embodiment (not shown), the light-emitting body 2200 is slidably arranged in the light troughs 1110 and can only emit light in one color to realize single-color temperature light-emitting effect. In other embodiments (not shown), three, four or more light-emitting bodies 2200 can be arranged.

In this embodiment, the light guide module 4000 comprises a light guide plate 4100 and a diffusion plate 4200, the diffusion 4200 is located above the light guide plate 4100, a gap is formed between the diffusion plate 4200 and the light guide plate 4100, the connecting end cover 1200 comprises a spacer block 1270, and the spacer block 1270 is inserted into the gap.

Wherein, the gap is reserved between the light guide plate 4100 and the diffusion plate 4200 to ensure that light guided by the light guide plate 4100 can be smoothly projected onto the diffusion plate 4200 to guarantee normal operation of the diffusion plate 4200; the spacer block 1270 is designed to support two ends of the light guide plate 4100 and two ends of the diffusion plate 4200 to limit the light guide plate 4100 and the diffusion plate 4200 so as to prevent the light guide plate 4100 and the diffusion plate 4200 from shaking, and the situation where the light guide plate 4100 and the diffusion plate 4200 are attached to each other and the gap disappears is prevented, thus improving the structural stability and using stability of the light guide module 4000.

Further, referring to FIG. 3 and FIG. 14, the circuit board 2100 is connected to a power supply 3000 by a socket 2150, and the power supply 3000 is located in the receiving cavity 1100. In this embodiment, the power supply 3000 is mounted in the receiving cavity 1100 by bonding. In other embodiments, the power supply 3000 may be mounted in the receiving cavity 1100 by fastening or threaded connection or in other ways. Meanwhile, to fill a gap between the power supply 3000 and the light guide module 4000, a flexible element 3100 is arranged above the power supply 3000 and abuts against the bottom of the light guide module 4000, and the flexible element 3100 can adapt to power supplies 3000 with different thicknesses, such that the power supply 3000 is prevented from moving in the vertical direction, thus being prevented from falling off.

In this embodiment, the flexible element 3100 is an EVA foam pad, which is elastic and thus is able to adapt to power supplies 3000 with different thicknesses. In other embodiments (not shown), the flexible element 3100 may also be a spring, a sponge or other elastic materials.

As another preferred embodiment of the invention, the invention further provides a method for lighting a cabinet, comprising a novel under-cabinet light and a cabinet.

When used, the novel under-cabinet light needs to be assembled first. Specifically, a power supply 3000 and a circuit board 2100 are mounted in a receiving cavity 1100 of a housing 1000, then a light-emitting body 2200 is inserted into a light trough 1110, the power supply 3000 and the light-emitting body 2200 are electrically connected to the circuit board 2100 by a wire, a light guide module 4000 is then inserted into a sliding groove 1120 to seal the housing 1000, connecting end cover 1200 are finally mounted at two ends of the housing 1000 to form the under-cabinet light, and a light-emitting module 2000, the power supply 3000 and the circuit board 2100 are enclosed in the housing 1000, and at this moment, the under-cabinet light can be used normally. Preferably, the novel under-cabinet light is attracted onto the cabinet by a magnetic element 5300.

When the novel under-cabinet light needs to be detached to be maintained, the connecting end cover 1200 are detached from the housing 1000, at this moment, the ends of the receiving cavity 1100 are open, the light guide module 4000 is taken out to expose the light-emitting body 2200, the power supply 3000 and the circuit board 2100, and at this moment, users can check corresponding parts to repair or directly detach and replace a damaged part, such that operation is easy; and after being maintained, the novel under-cabinet light is reassembled according to the assembly steps.

Further, the light-emitting body 2200 has multiple light-emitting modes, and users adjust the light-emitting modes of the light-emitting body 2200 by the circuit board 2100 to adapt to different occasions.

To sum up, through the cooperation of the connecting end cover 1200 and the receiving cavity 1100, the under-cabinet light can be assembled and disassembled easily, assembly in the early stage and disassembly and maintenance in the later stage are facilitated, and the practicability is further improved.

To sum up, the novel under-cabinet light provided by the invention has the following advantages: detachable design: the light-emitting module 2000 and the circuit board 2100 can be detached from the housing 1000, such that parts can be maintained and replaced more conveniently; safety: the connecting end cover 1200 can seal the ends of the receiving cavity 1100 to prevent the light-emitting module 2000 from sliding out accidentally; flexibility: the light-emitting body 2200 can slide in the light trough 1110, which means that users can adjust the position of the light-emitting body as needed; stability: the light-emitting module 2000 can be fixed by the magnetic element 5300 in the fixing seat 5000 to be prevented from moving in use; easy to install: when the connecting end cover 1200 are separated from the housing 1000, the ends of the receiving cavity 1100 are open, such that installation can be performed more easily.

In a broad sense, the under-cabinet light provided by the invention can be applied to various fields including, but not limited to, home lighting (for example, the under-cabinet light can be used in cabinets in kitchens, washrooms and bedrooms to provide lighting and improve the interior decoration effect), commercial spaces (for example, the under-cabinet light can be applied to display cabinets in stores, restaurants and hotels to improve the commodity display effect), work environments (for example, the under-cabinet light can be applied to file cabinets and bookshelves to provide sufficient lighting to allow users to check and read files), and communal facilities (for example, the novel under-cabinet light can be applied to cabinets in museums, libraries and hospitals to provide lighting to allow users to check and use articles).

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

What is claimed is:

1. A novel under-cabinet light, comprising a housing and a light-emitting module, wherein:

the housing is provided with a receiving cavity, the light-emitting module is detachably arranged in the receiving cavity, a connecting end cover is detachably connected to the housing and seals an end of the receiving cavity to prevent the light-emitting module from disengaging from the end of the receiving cavity, and a light trough is arranged on a side wall of the receiving cavity;

the light-emitting module comprises a circuit board and a light-emitting body detachably connected to the circuit board;

a fixing seat is detachably arranged in the housing and located in the receiving cavity, and a magnetic element is arranged on the fixing seat;

the circuit board is detachably connected to the connecting end cover, and the light-emitting body is slidably arranged in the light trough; and when the connecting end cover is separated from the housing, the end of the receiving cavity is open, the connecting end cover drives the circuit board to move away from the receiving cavity, and the light-emitting body slides in a length direction of the receiving cavity to be separated from the housing; and the receiving cavity is provided with a slot, the connecting end cover comprises a connecting plate and an insert, the connecting plate is slidably arranged in the slot, and the insert is inserted into the light trough.

2. The novel under-cabinet light according to claim 1, wherein a screw hole is formed in the receiving cavity, a through-hole matched with the screw hole is formed in the connecting end cover, and the connecting end cover is threadedly connected to the screw hole by the through-hole.

3. The novel under-cabinet light according to claim 2, wherein one said connecting end cover is detachably connected to the housing, a sealing end cover is detachably arranged on the housing, and the sealing end cover and the connecting end cover are oppositely arranged at two ends of the housing to seal or open the receiving cavity.

4. The novel under-cabinet light according to claim 2, wherein one said connecting end cover is detachably connected to the housing, the housing has a closed end and an open end, and the connecting end cover is detachably arranged at the open end.

5. The novel under-cabinet light according to claim 3, wherein bulges and clamping pieces are fixedly arranged on the connecting end cover, the clamping pieces extend downwards from the connecting plate, the circuit board comprises clamping holes, the circuit board is laid on the bulges, and the clamping pieces are connected to the clamping holes to clamp the circuit board on the connecting end cover.

6. The novel under-cabinet light according to claim 5, wherein a light lens is arranged on the connecting plate; and an infrared sensor, a light threshold sensor and a key are arranged on the circuit board; and the infrared sensor and the light threshold sensor monitor an outside condition by the light lens; and the key penetrates through the connecting plate to be used by users to control operation of the circuit board.

7. The novel under-cabinet light according to claim 6, wherein a socket is fixedly arranged on the circuit board, the light-emitting body is electrically connected into the socket by a wire, and the circuit board is connected to a power supply by the socket, and the power supply is located in the receiving cavity.

8. A novel under-cabinet light, comprising a housing and a light-emitting module, wherein:

the housing is provided with a receiving cavity, the light-emitting module is detachably arranged in the receiving cavity, a connecting end cover is detachably connected to the housing and seals an end of the receiving cavity to prevent the light-emitting module from disengaging from the end of the receiving cavity, and a light trough is arranged on a side wall of the receiving cavity;

the light-emitting module comprises a circuit board and a light-emitting body detachably connected to the circuit board;

a fixing seat is detachably arranged in the housing and located in the receiving cavity, and a magnetic element is arranged on the fixing seat;

the circuit board is detachably connected to the connecting end cover, and the light-emitting body is slidably arranged in the light trough; and when the connecting end cover is separated from the housing, the end of the receiving cavity is open, the connecting end cover drives the circuit board to move away from the receiving cavity, and the light-emitting body slides in a length direction of the receiving cavity to be separated from the housing;

the light-emitting body comprises a light panel and light-emitting elements arranged on the light panel at intervals in the length direction of the receiving cavity, and a length of the light panel is less than a length of the light trough; and a sliding rail is arranged at a bottom of the receiving cavity, slide buckles are arranged at two ends of the fixing seat and are in transition fit with the sliding rail to slidably arrange the fixing seat in the receiving cavity, and when static, the fixing seat is fixed to a current position by the slide buckles.

9. The novel under-cabinet light according to claim 8, wherein the fixing seat is provided with a fixing cavity, the magnetic element is arranged in the fixing cavity, the fixing cavity is made from an elastic material, and a receiving height of the fixing cavity is changeable to allow magnetic elements with different thicknesses to be received in the fixing cavity.

10. A novel under-cabinet light, comprising a housing and a light-emitting module, wherein:

the light-emitting module comprises a circuit board, light-emitting bodies and a light guide module, and the light-emitting bodies are detachably connected to the circuit board; and the housing is provided with a receiving cavity, the light-emitting module is detachably arranged in the receiving cavity, a connecting end cover is detachably connected to the housing and seals an end of the receiving cavity to prevent the light-emitting module from disengaging from the end of the receiving cavity, light troughs and sliding grooves are arranged on side walls of the receiving cavity, and the light troughs are connected to the sliding grooves to allow light emitted by the light-emitting bodies to be guided to outside by a light guide module; and a fixing seat is detachably arranged in the housing and located in the receiving cavity, and a magnetic element is arranged on the fixing seat;

the circuit board is detachably connected to the connecting end cover, and the light-emitting bodies and the light guide module are slidably arranged in the light troughs and the sliding grooves respectively; and when the connecting end cover is separated from the housing, the end of the receiving cavity is open, the connecting end cover drives the circuit board to move away from the receiving cavity, and the light-emitting bodies and the light guide module slides in a length direction of the receiving cavity to be separated from the housing; and the light guide module comprises a light guide plate and a diffusion plate, the diffusion plate is located above the light guide plate, a gap is formed between the diffusion plate and the light guide plate, and the connecting end cover comprises a spacer block, and the spacer block is inserted into the gap.

11. The novel under-cabinet light according to claim 10, wherein the light troughs and the sliding grooves are formed in two side walls of the receiving cavity, number of the light-emitting bodies is two, the light-emitting bodies are correspondingly arranged in the light troughs, and the light guide module is slidably connected to the receiving cavity by the sliding grooves.

12. The novel under-cabinet light according to claim 11, wherein the receiving cavity, the light troughs and the sliding grooves extend and penetrate through the housing to be connected to outside, such that the light-emitting bodies and the light guide module are able to slide in and out of the light troughs and the sliding grooves respectively.

13. The novel under-cabinet light according to claim 12, wherein the light guide module is arranged above the receiving cavity, and the light guide module and the connecting end cover completely seal the receiving cavity to prevent parts from falling out of the receiving cavity.

14. The novel under-cabinet light according to claim 10, wherein the light-emitting module is electrically connected to a power supply, a flexible element is arranged above the power supply and abuts against a bottom of the light guide module, and the flexible element prevents the power supply from moving in a vertical direction.

* * * * *